US 9,950,856 B2

(12) United States Patent
Stefanelli et al.

(10) Patent No.: US 9,950,856 B2
(45) Date of Patent: Apr. 24, 2018

(54) SPLIT DISPENSING HOPPER

(71) Applicant: Spee-Dee Packaging Machinery, Inc., Sturtevant, WI (US)

(72) Inventors: Anthony D. Stefanelli, Elkhorn, WI (US); Mark A. Navin, Franklin, WI (US)

(73) Assignee: Spee-Dee Packaging Machinery, Inc., Sturtevant, WI (US)

( * ) Notice: Subject to any disclaimer, the term of this patent is extended or adjusted under 35 U.S.C. 154(b) by 33 days.

(21) Appl. No.: 15/275,890

(22) Filed: Sep. 26, 2016

(65) Prior Publication Data

US 2017/0088371 A1    Mar. 30, 2017

Related U.S. Application Data

(60) Provisional application No. 62/232,987, filed on Sep. 25, 2015.

(51) Int. Cl.
| | |
|---|---|
| *B67D 7/06* | (2010.01) |
| *B65D 83/06* | (2006.01) |
| *B65D 83/00* | (2006.01) |
| *B65G 65/46* | (2006.01) |

(52) U.S. Cl.
CPC .............. *B65D 83/06* (2013.01); *B65D 83/00* (2013.01); *B65G 65/463* (2013.01)

(58) Field of Classification Search
CPC ....... B65D 85/06; B65D 85/00; B65G 65/463
USPC ........ 222/181.1, 181.2, 181.3, 182, 185.141, 222/408.5, 197, 127; 141/41–75; 220/4.21–4.25, 4.29, 4.31, 4.33, 4.34
See application file for complete search history.

(56) References Cited

U.S. PATENT DOCUMENTS

| 5,327,947 | A | * | 7/1994 | McGregor | ................ B65B 1/08 100/145 |
| 5,533,650 | A | * | 7/1996 | Conrad | ............... B29C 47/1009 222/161 |
| 5,613,464 | A | * | 3/1997 | Petzel | .................... A01K 5/025 119/55 |
| 8,408,424 | B2 | * | 4/2013 | Saunders | ............... B65G 65/44 222/185.1 |
| 9,117,325 | B1 | * | 8/2015 | Sloan | ...................... G07F 13/02 |

(Continued)

OTHER PUBLICATIONS

Spee-Dee Packaging Machinery, Inc., Solutions Brochure, 2012, 14 pages.

(Continued)

*Primary Examiner* — Lien Ngo
(74) *Attorney, Agent, or Firm* — Boyle Fredrickson, S.C.

(57) ABSTRACT

A split hopper for dispensing granular or powdery materials has a hopper body and a lid. At least the hopper body is formed principally from a castable resin material such as polyurethane. The hopper body is formed from two hopper body sections mating at vertical faces and hinged to one another. Tooling mounts and other features such as clamping lugs can be cast directly into the hopper body sections during the casting process. The lid may be sealed to the top of the hopper body via a ring seal that may seal both radially and axially against the hopper body. A tool holder may be provided beneath the discharge opening of the hopper body for selectively engaging tooling so that the tooling does not fall out of the hopper body when the hopper body is opened.

19 Claims, 9 Drawing Sheets

(56) References Cited

U.S. PATENT DOCUMENTS

2009/0008410 A1\* 1/2009 Kosich .............. B65D 88/1668
　　　　　　　　　　　　　　　　　　　　　　　　　222/105

OTHER PUBLICATIONS

Eagle, Jenny, Spee-Dee Packaging Machinery Debuts Its Split Hopper Dry Powder Filler, www.dairyreporter.com, Oct. 21, 2014, pp. 1-3.

\* cited by examiner

SPLIT DISPENSING HOPPER

CROSS REFERENCE TO A RELATED APPLICATION

This application claims priority under 35 USC § 1.119(e) to earlier U.S. Provisional Patent Application Ser. No. 62/232,987, filed Sep. 25, 2015 and entitled SPLIT DISPENSING HOPPER, the contents of which are incorporated by reference in their entirety.

BACKGROUND OF THE INVENTION

Field of the Invention

The invention relates to dispensing hoppers and, more particularly, relates to a so-called "split hopper" for dispensing granular or powdery materials into an underlying container.

Discussion of the Related Art

Hoppers are widely used to dispense granular or powdery materials into underlying containers such as bags or packages. The typical hopper includes a generally frustoconically-shaped hopper body that has a relatively small lower dispensing opening and an open upper end that closable with a lid or cover. A dispensing auger extends downwardly through the center of the interior of the hopper body, through the lower dispensing opening for dispensing materials from the hopper at a controlled rate, and directs the dispensed material into an underlying container or package through a tool mounted on the bottom of the hopper.

So-called "split hoppers" are available the hopper body of each of which is formed in two sections that are hinged to one another so as to permit the hopper body to be opened for cleaning and tool replacement. Split hoppers are particularly attractive to users that need to reconfigure the hopper for different products as frequently as ever few hours. These users need to clean the inside of the hopper as part of the changeover process. A split hopper greatly facilitates this cleaning, along with related changeover operations, such as tool replacement.

The typical such hopper body is made of stainless steel and is capable of storing and dispensing from 16 to 20 gallons of material. The lid may also be made of stainless steel. One such hopper is commercially available from Spee-Dee Packaging Machinery, Inc. of Sturtevant, Wis.

Stainless steel split hoppers work very well but are very expensive on a per-unit basis to fabricate and assemble. This is due in part to the fact that stainless steel is expensive to acquire and fabricate.

In addition, the primary ring seal that seals the lid of the typical split hopper to the underlying hopper body typically provides a seal at only one peripheral location, risking loss of seal integrity.

The expense and complexity of the typical split hopper also are exasperated by the need for five separate seals in and around the lid.

In addition, the typical split hopper does not include any mechanism to hold a tool. As a result, the tool may fall out of the hopper when the hopper is open, with resultant risk of damage to the tool.

The need therefore exists to provide improvements to existing split hopper designs.

SUMMARY OF THE INVENTION

In accordance with one aspect of the invention, a split hopper is provided having a hopper body and a lid. At least the hopper body is formed principally from a castable resin material rather than stainless steel or another metal. The material may be a urethane or another material suitable for the selected application. The hopper body is formed from two hopper body sections mating at vertically inclined faces and hinged to one another. Tooling mounts and other elements can be cast directly into the hopper body sections during the casting process.

The lid may be sealed to the top of the hopper body via a ring seal. The ring seal may be generally L-shaped when viewed in transverse cross section and may have at least two radial seals that seal against the inner surface of the hopper body and additionally has an axial seal that seals against an upwardly-facing surface of the hopper body.

Openings may be provided on the lid for receiving ancillary devices, and those openings may also be sealed to the ancillary devices by internal seals. All such seals may be cast into the lid. One or more of the seals can be formed integrally with one another and/or with the ring seal.

Clamp assemblies may be provided for clamping the hopper body sections together. Each clamp assembly may engage first and second lugs which are cast into the first and second hopper body sections, respectively. Each clamp assembly may include first and second relatively moveable clamp components that cooperate with one another and with the lugs to selectively clamp the hopper body sections together.

A tool holder may be provided beneath the discharge opening of the hopper body for selectively engaging tooling so that the tooling does not fall out of the hopper body when the hopper body is opened.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Exemplary embodiments of the invention are illustrated in the accompanying drawings, in which like reference numerals represent like parts throughout, and in which.

DETAILED DESCRIPTION

Figure 1:
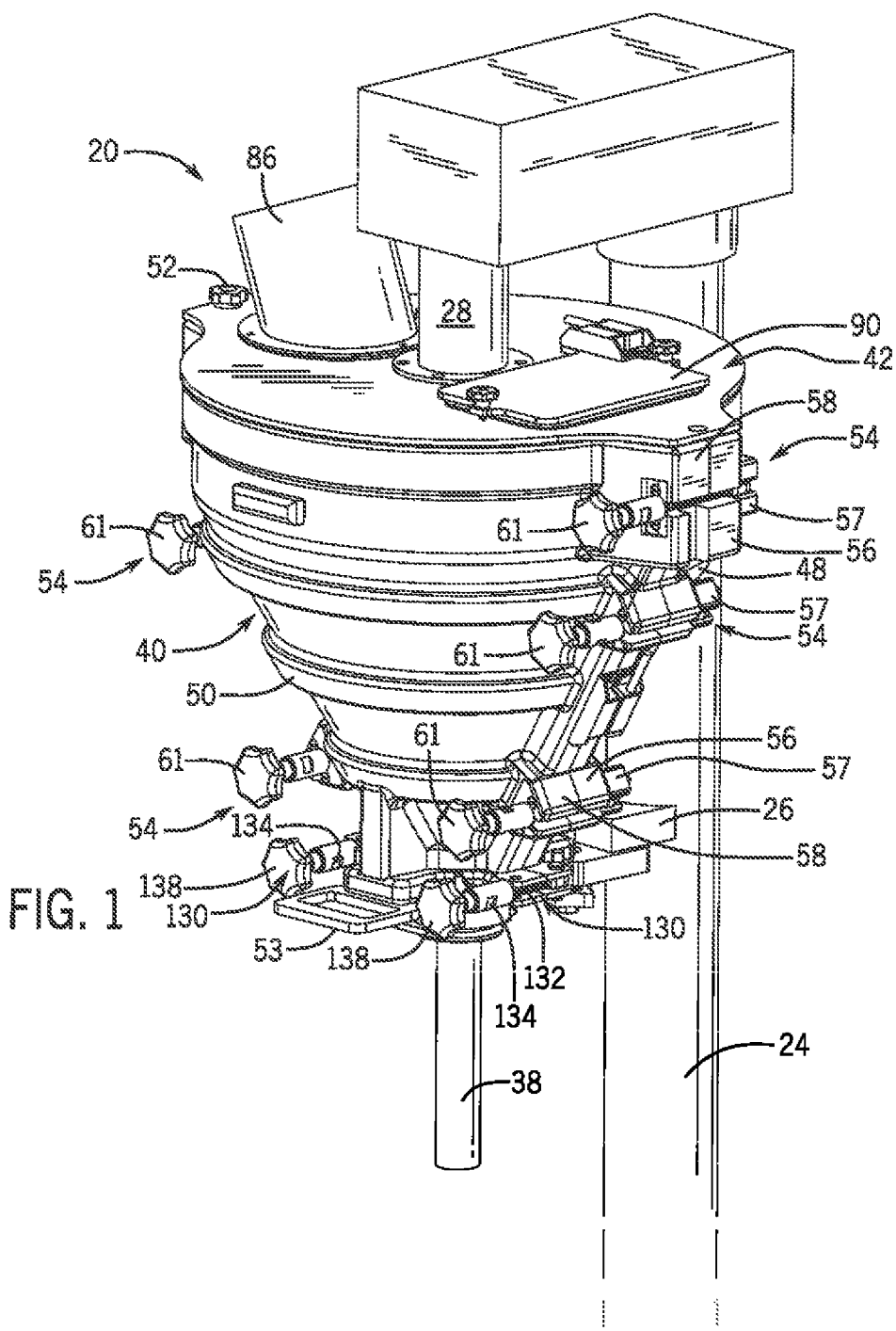
FIG. 1 is a perspective view of a split hopper constructed in accordance with the present invention, viewed from in front of the split hopper with the hopper body in its closed position.
Figure 2:
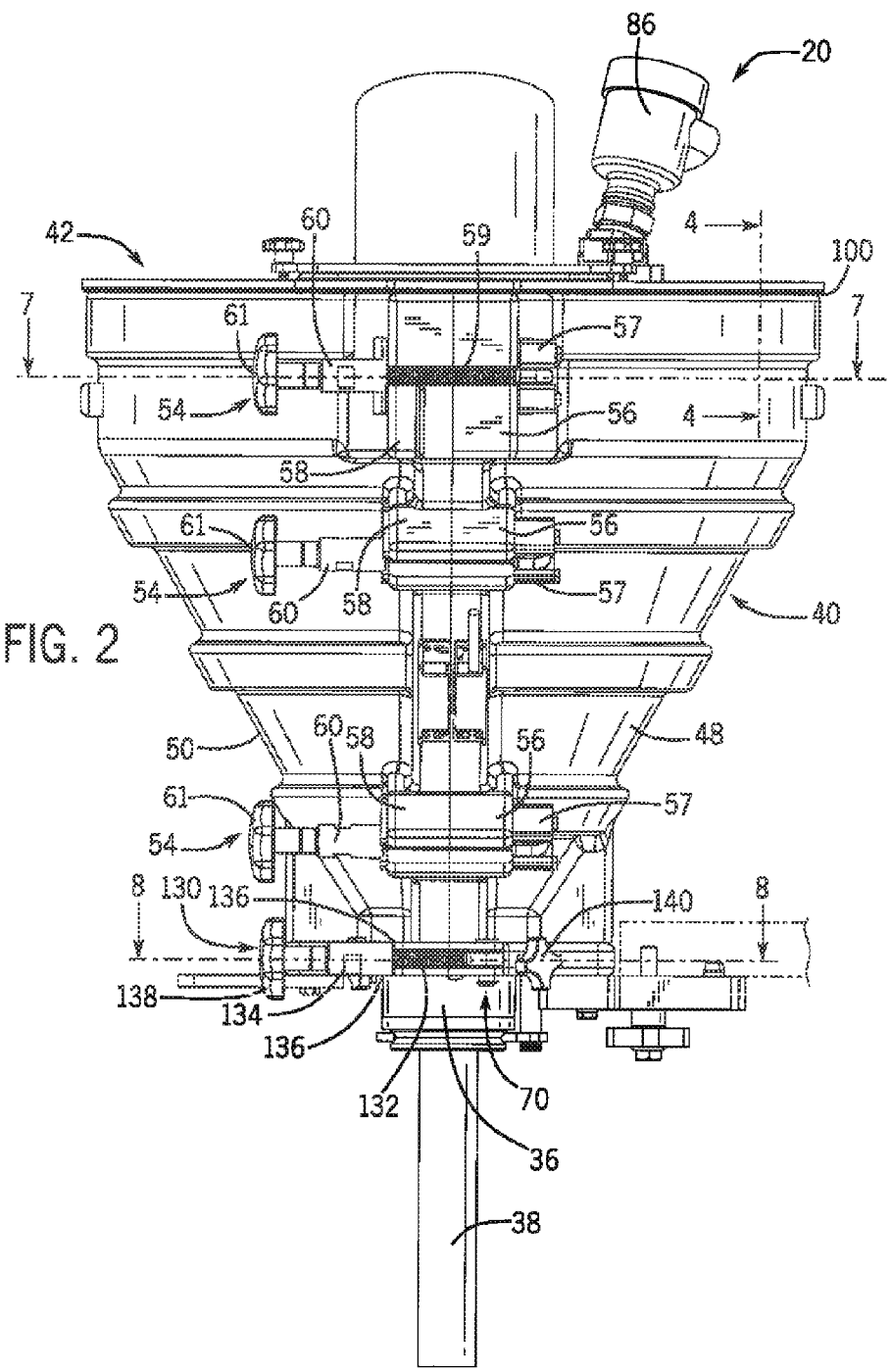
FIG. 2 is a side elevation view of the hopper body of FIG. 1, shown in greater detail, but showing the hopper body in its closed position.
Figure 3:
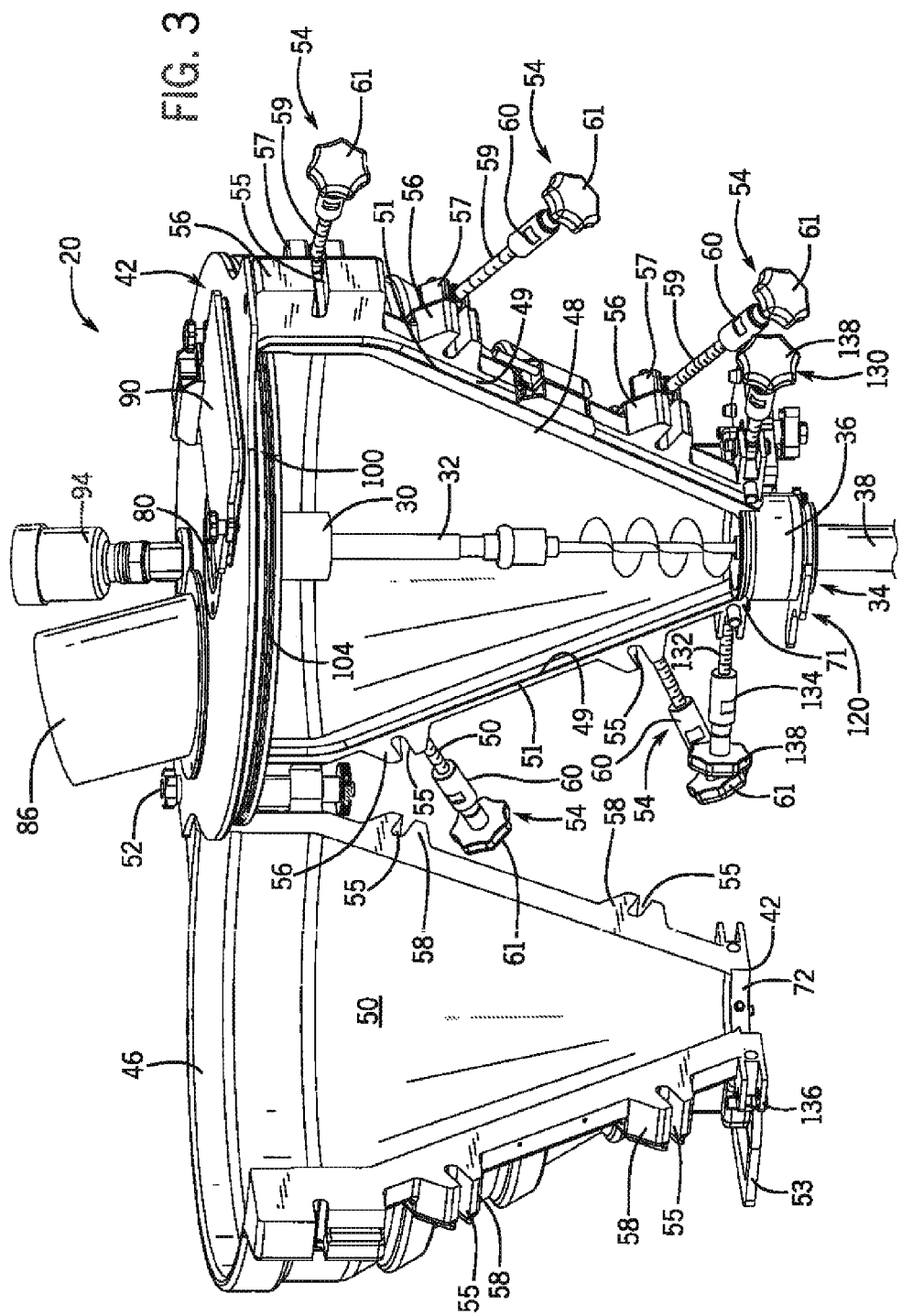
FIG. 3 corresponds to FIG. 2 and shows the hopper in its open position.
Figure 8:
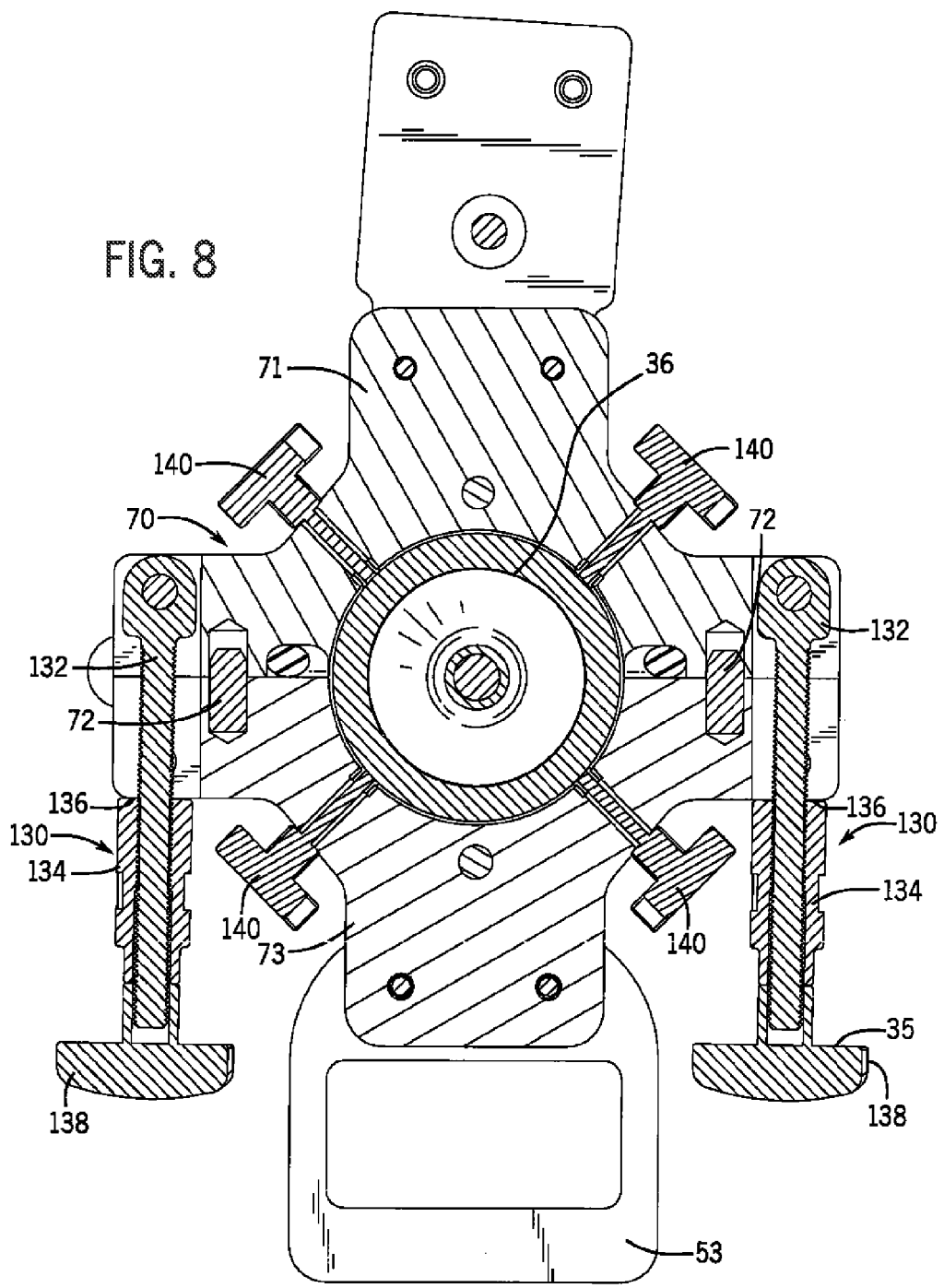
FIG. 8 is a sectional plan view of the split hopper, taken generally along the line 8-8 in FIG. 2.

Referring now to the various views and initially to FIGS. 1-3, a split hopper 20 is illustrated that is constructed in accordance with the present invention. The hopper 20 is configured to store and dispense a powdery or granular material and may have a capacity of, for example, 16 to 20 gallons. The hopper 20 is mounted on a mobile stand that includes a wheeled base (not shown), a vertical support post 24, a central hopper support arm 26, and an upper auger holder 28, both of which extend horizontally from the vertical post 24. A spindle 30 extends into the hopper 20 from the auger holder 28 for rotatably supporting a dispensing auger 32. The auger 32 extends into a tool 34 in the form of a stepped tubular element located beneath the hopper 20. Tool 34 is clamped in place by two clamps 130 and four set screws 140 (FIGS. 8-10) that must be loosened to open the hopper body 40. Tool 34 includes a collar 36 and a dispensing tube 38 located beneath the collar 36.

The hopper 20 includes a two-part hopper body 40 and a lid 42 that, during operation, is sealed to the top of the hopper body 40. The hopper body 40 is formed from a resin material. Any of number of materials could be used. The ideal material is castable because gravity cast molds are very inexpensive when compared to injection molds. It also should be sufficiently strong and durable to survive the rigors of industrial settings. In some applications it should preferably be FDA approved and sufficiently non-porous to be cleanable to "3-A" Sanitary Standards or "3-A-SSI." An ideal material also should be transparent to x-rays and/or metal detectors so as permit inspection of the interior of the hopper 20 during shipment. Urethane is acceptable for all of these purposes. However, other castable and even injection-moldable materials would be suitable for some or all of these purposes as well. The hopper 20 as a whole provides at least a 50% cost reduction when compared to a stainless steel hopper of equal capacity and capabilities.

Referring now to FIGS. 1-3, the hopper body 40 is generally frustoconical in shape so as to have a relatively small lower dispensing opening 44 that receives the tool 34 and an open upper end 46 that is closable with the lid 42. The uppermost end of the hopper body 40 is cylindrical for mating with the lid 42 as detailed below. The hopper body 40 is formed from two hopper body sections 48 and 50 and thus is "split" vertically down the center. The hopper body sections 48 and 50 may be cast from two components, with the two components being a general mirror image of one another.

Figure 4:
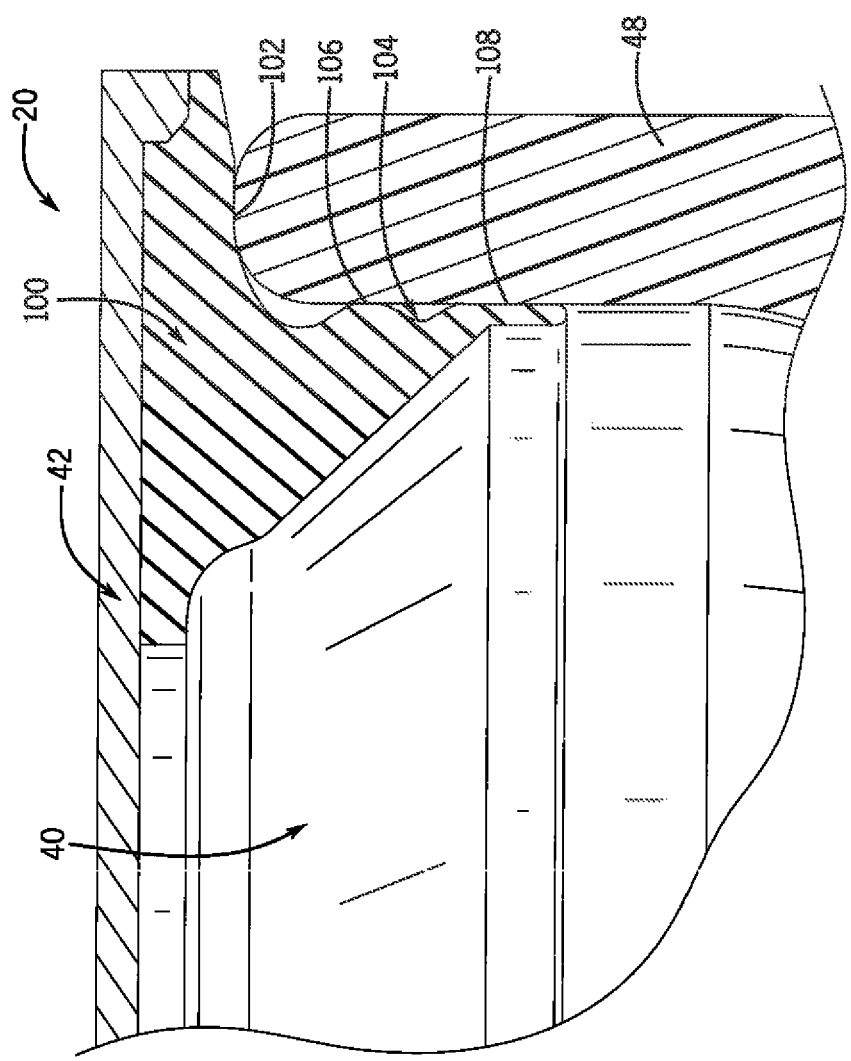
FIG. 4 is a fragmentary side elevation view of the upper end of the split hopper taken along the line 4-4 in FIG. 2.

Referring to FIGS. 3 and 4, a groove 49 is formed in each surface of one of the hopper body sections 48 for receiving a side seal 51 that engages a mating surface of the hopper body section 50 when the hopper body is closed. Each seal 51 may be formed from the same or a comparable material as the material of the upper seals in the lid 42, described below.

Referring to FIGS. 1-3 and 9, the sections 48 and 50 of the hopper body 40 are connected to one another at one side via a hinge 52 that permits one hopper body section 50 to move relative to the other hopper body section 48 under operation of a handle 53 located at the bottom of section 50. The two sections hopper body 48 and 50 can be selectively clamped together via a plurality of vertically spaced clamp assemblies 54. Five such clamp assemblies 54 are provided in the illustrated embodiment, two of which are located beneath the hinge 52 and three of which are provided on the side of the hopper body 40 opposite the hinge 52. Each clamp assembly 54 has first and second relatively moveable components that cooperate with one another and with slotted lugs 56 and 58 that are cast into the hopper body sections 48 and 50 to selectively clamp the hopper body sections 48 and 50 together. Referring to FIGS. 1-3, 9, and 10, each clamp assembly 54 of this embodiment includes a base 57, cast into or otherwise affixed to the outer surface of one of the lugs 56, and a shank 59 that is pivotally attached to the base 57 and that is selectively pivotable into engagement with the other lug 58. The shank 59 is sufficiently long to extend through mating slots 55 in both lugs 56 and 58. The end of the shank 59 is threaded and receives a clamping cylinder 60 that can be selectively tightened into contact with the outer surface of the associated lug 58 via operation of a knob 61.

Figure 6:
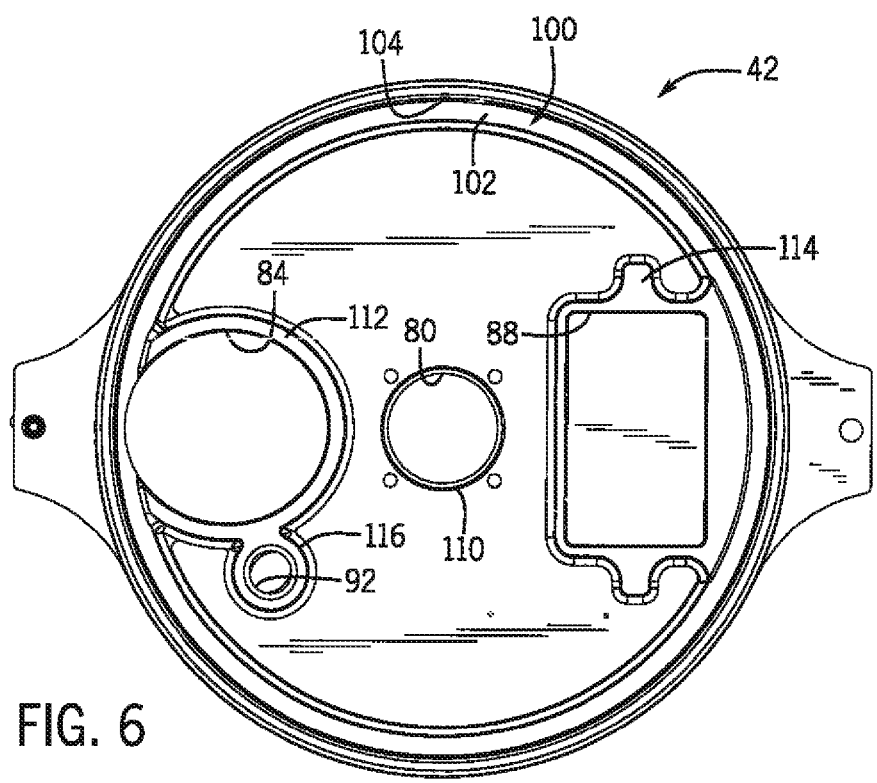
FIG. 6 is a bottom plan view of the lid of the split hopper.
Figure 7:
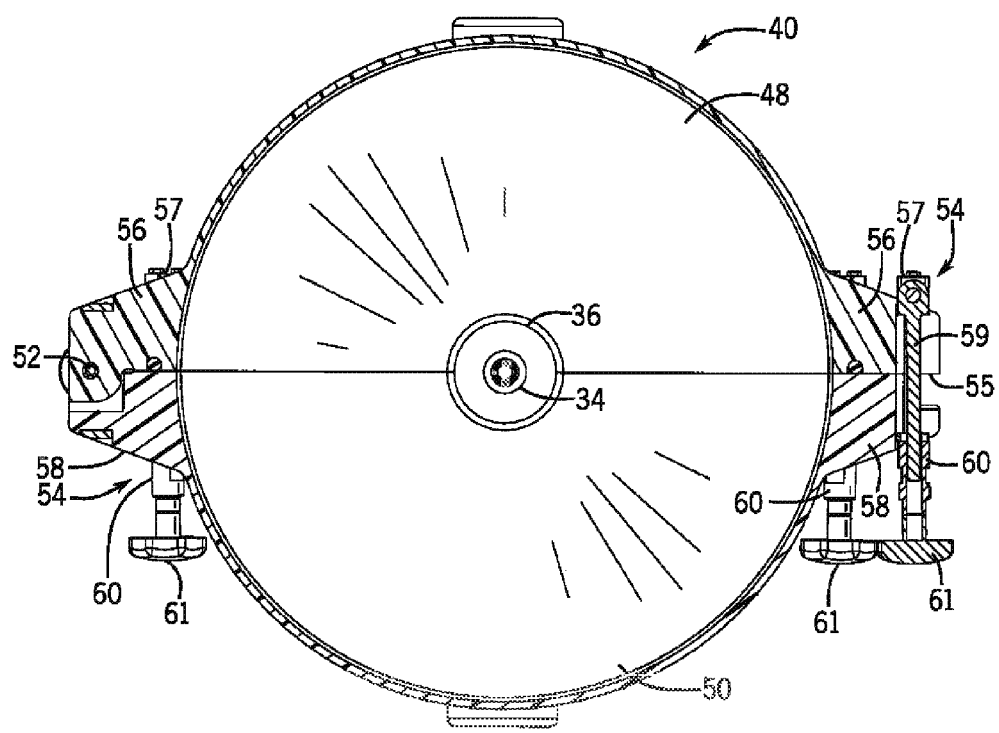
FIG. 7 is a section top plan view of the split hopper taken along the line 7-7 in FIG. 2.

A two-part stainless steel tooling mount 70 is cast into the bottom of the hopper body 40 in a surrounding relationship with the dispensing opening 44 as best seen in FIGS. 2, 3, 8, 9, and 10. This mount 70 comprises a split collar, one portion 71 of which has alignment pins 72 that are insertable into openings in the mating portion 73 of the split collar 70 as seen in FIG. 6. One portion 71 of the split collar 70 is bolted onto a hopper mount 74 which, in turn, is bolted to the support arm 26. The other portion 73 of the split collar 70 has the handle 53 attached to or formed integrally therewith. The split collar 70 supports and seals against the collar 36 of tool 38 when the split collar hopper body 40 is closed and permits tool removal when the hopper body 40 is open. The split collar 70 can be clamped closed by first and second opposed clamps 130 each having a shank 132 pivotally attached to the collar section 71. The shank 132 of each clamp 130 receives clamping cylinder 134 that can be tightened against a lug 136 on collar section 73 by a knob 138.

Referring now to FIGS. 3-6, the lid 42 is formed from stainless steel, but could be injection molded or even could be cast. Lid 42 has a central opening 80 that receives the spindle 30. It also includes a fill opening 84 that receives a fill chute 86 for supplying materials to be dispensed into the interior of the hopper body 40. An inspection opening 88, sealable by an outer access cover 90, also is provided in the lid 42 to permit operators to inspect material stored in the hopper 20. Finally, an opening 92 is formed in the lid 42 for receiving a vibratory level control device 94 that extends into the hopper body 40 from above. All of the openings 80, 84, 88, and 92 are sealed as discussed below.

Referring to FIGS. 4-6 and 8, a gasket seal ring 100 is provided around the outer perimeter of the lid 42. This seal ring 100 is generally L-shaped when viewed in transverse cross-section so as to have a downwardly-facing generally horizontal sealing surface 102 and an outwardly facing generally vertical surface 104. The sealing surface 102 seals against an upwardly facing surface of the hopper body 40 which, in the illustrated embodiment, comprises the upper edge of the hopper body 40. Two spaced annular radial sealing surfaces 106 and 108 on the vertical surface 104 radially seal against the inner periphery of the hopper body 40. The seal ring 100 thus seals against the hopper body 40 at three spaced locations, two of which provide radial seals and one of which provides an axial seal. This sealing arrangement greatly enhances seal integrity.

Figure 5:
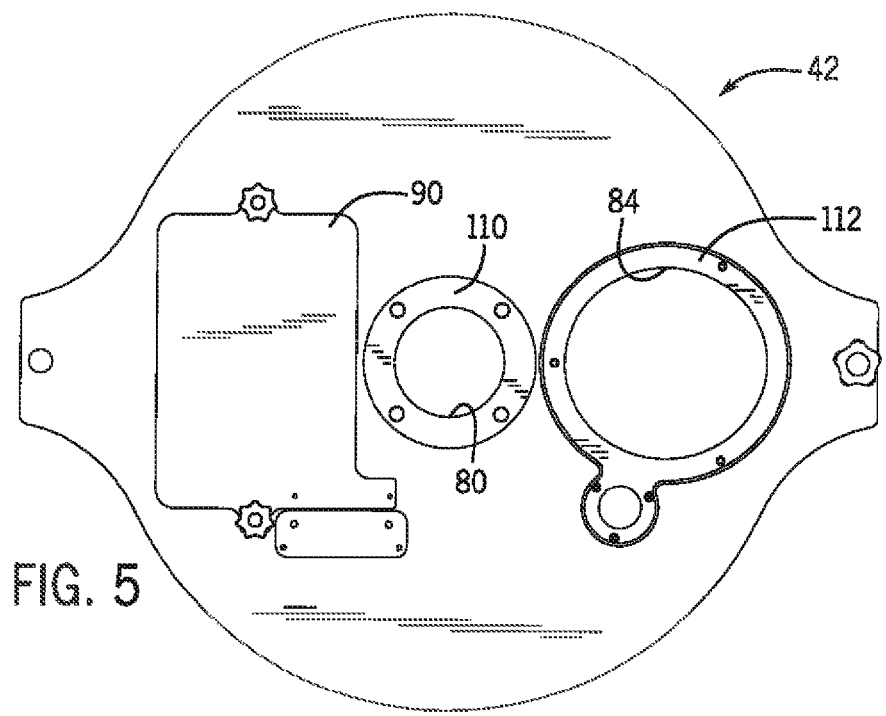
FIG. 5 is a top plan view of the lid of the split hopper.

Referring especially to FIGS. 5 and 6, the openings 80, 84, 88, and 92 are sealed by respective seals 110, 112, 114, and 116, all of which can be cast into the lid 42, along with the seal ring 100. The seals 112, 114, and 116 can be coupled and cast with the ring seal 100 so that only two silicon pieces need to be provided on each side of the lid 42, one for forming the seal 110 at the central opening for receiving the spindle 30 and one for forming the remaining seals 100, 112, 114, and 116. This construction dramatically reduces the number of required components and facilitates molding. Cast gaskets are beneficial because they cannot fall into the underlying hopper body 40. They also can be easily wiped for cleaning.

The side seals 51 and the seals 100, 110, 112, 114, and 116 could be formed from silicon or a soft durometer urethane also could be used. If the lid 42 were to be injection-molded rather than cast, then Viton or Buna N rubber could be used for at least the seals that engage the lid 42.

Figure 9:
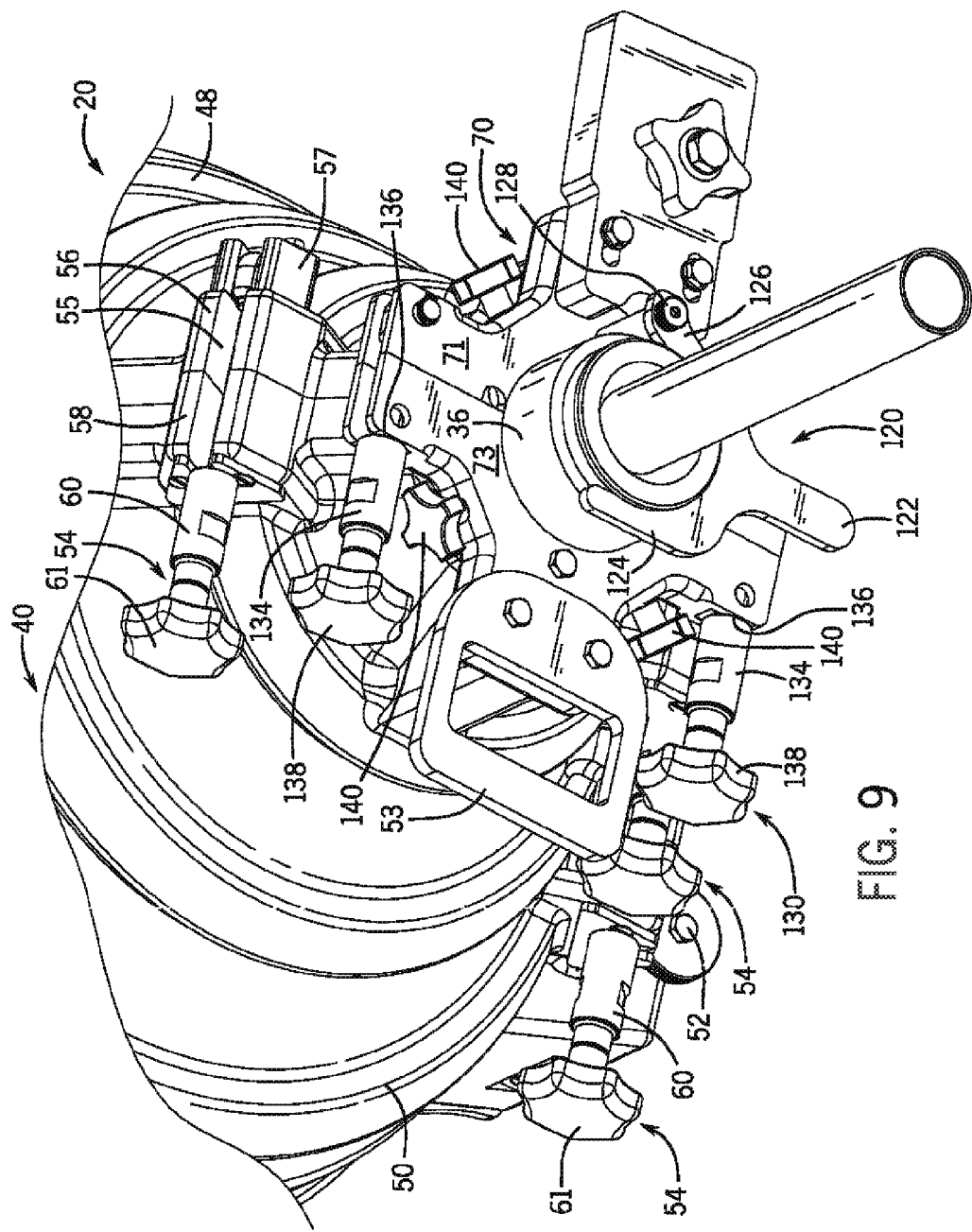
FIG. 9 is a bottom plan view of the split hopper in a closed position and showing a tooling holder of the split hopper in an engaged or operative position.
Figure 10:
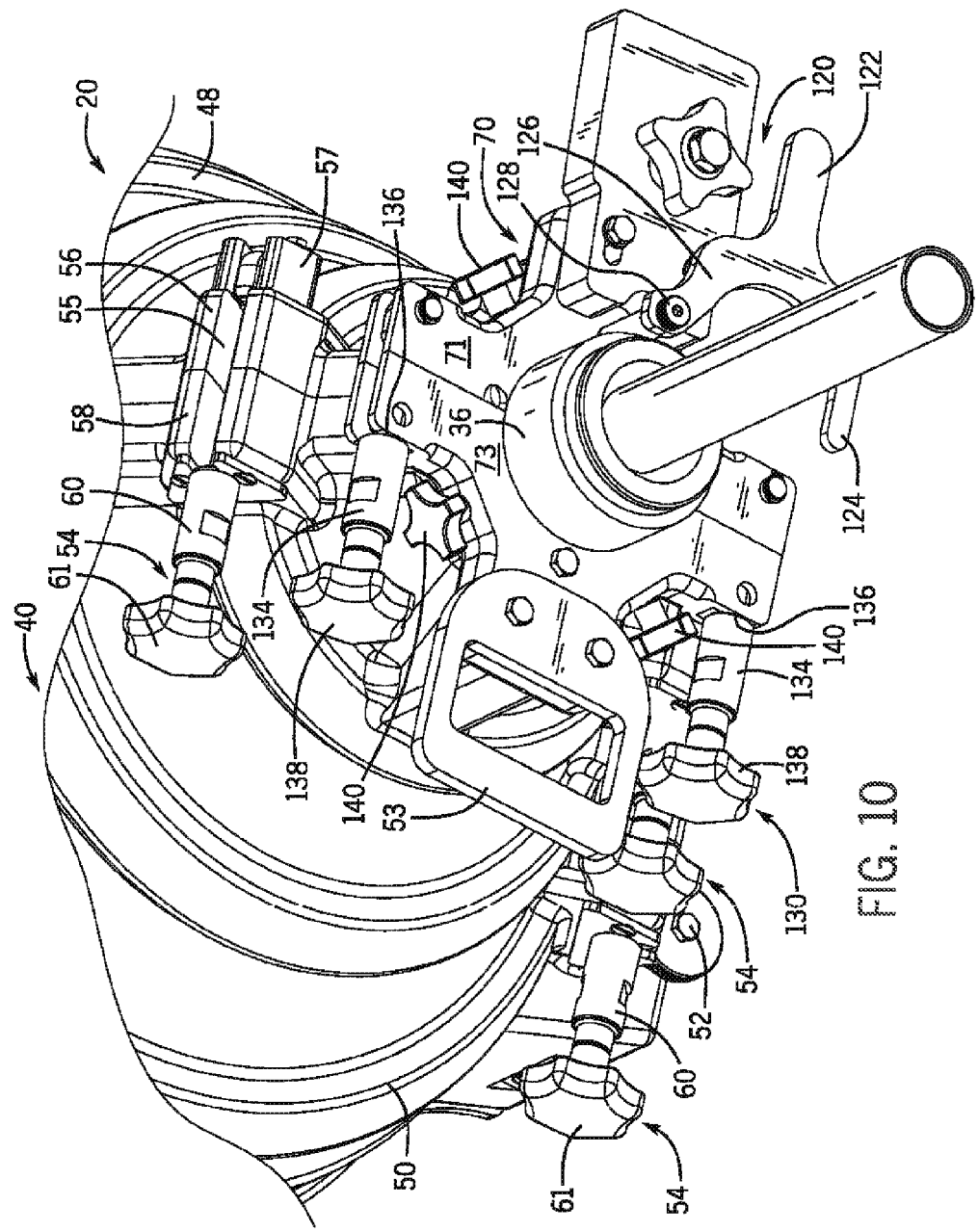
FIG. 10 corresponds to FIG. 9 and shows the tooling holder in a disengaged or retracted position thereof.

Referring now to FIGS. 9 and 10, a tool holder 120 is provided at the bottom of the split hopper body 40 beneath the collar 36 of the tool 34. The tool holder 120 is configured to be manually movable 1) from an engaged or operative position in which it supports the collar 36 from below and prevents the tool 34 from falling from the hopper 20 when the hopper body 40 is open and the set screws 140 are loosened 2) to a disengaged or retracted position in which it is spaced from the collar 36, permitting tool removal. The illustrated tool holder 120 includes a generally Y-shaped metal element forming a handle 122 at one end of the Y and first and second arms 124 and 126 at the opposite end of the Y. When the tool holder 120 is in its engaged position, the arms 124 and 126 support the bottom surface of the collar 36 of tool 34 and flank the upper end of the tube 38 as illustrated in FIG. 9. When the tool holder 120 is in its disengaged position, the arms 124 and 126 are spaced from the collar 36 as seen in FIG. 10, permitting tool removal. One of the arms 126 has a hole formed in it that receives a shoulder bolt 128. The shoulder bolt 128 is threaded into the bottom surface of the tooling mount 70 with sufficient clamping force to fairly tightly hold the tool holder 120 in place in either its engaged or disengaged.

With this construction, the tool can be clamped in place and removed without using any tools. In fact, nothing needs to be removed when replacing tools. The tool holder 120 instead can be manually rotated against the moderate tension of the shoulder bolt 128.

To open the hopper body 40, all one need to do is loosen the knobs 61 of the hopper body clamp assemblies 54 and loosen the knobs 138 of the tool holder clamps 130, holding the tooling in place. The shanks 59 are then swung out of engagement with the slots in the lugs 58 of the clamp assemblies 54, and the shanks 132 are swung out of engagement with the lugs 136 of the clamps 130 as seen in FIG. 3. The operator can then grasp the handle 53 and pivot the hopper section 50 about the hinge 52 to expose the interior of the hopper body 40 for cleaning, maintenance, etc. The tool 34 is prevented from falling out of the open hopper body 40, even if the set screws 140 are not tight, by the tool holder 120.

If tool replacement is desired, the tool can be removed simply by loosening the set screws 140. The user then grasps the handle 128 of the tool holder and pivots the tool holder 120 about the bolt 128 from the position illustrated in FIG. 9 in which the collar 36 of the tool 34 rests on the arms 124 and 126 to the position illustrated in FIG. 10 in which the arms 124 and 126 clear the collar 36. The tool 34 can now be removed. The process is simply reversed to close the hopper body 40, whereupon the split collar 70 seals against the tool collar 36, the sides of the hopper body sections 48 and 50 are sealed by the side seals 51, and the top of the hopper body 40 seals against the seal ring 100.

Although the best mode contemplated by the inventor of carrying out the present invention is disclosed above, practice of the present invention is not limited thereto. It will be manifest that various additions, modifications and rearrangements of the aspects and features of the present invention may be made in addition to those described above without deviating from the spirit and scope of the underlying inventive concept.

We claim:

1. A hopper for dispensing granular or powdery materials comprising:
    (A) a generally frustoconical hopper body formed from first and second hopper body sections that are hinged together at one side thereof so as to be openable to expose an interior of the hopper and closable to seal the hopper interior, each of the first and second hopper body sections being formed from a cast resin material, wherein the hopper body is open at top and bottom ends thereof;
    (B) first and second side seals that are located at opposite sides of the hopper body and each of which seals mating surfaces of the first and second hopper body sections to one another; and
    (C) a lid that covers the upper opening in the hopper body and that seals against the first and second hopper body sections.

2. The hopper as recited in claim 1, wherein each of the hopper body sections is formed from a cast urethane material.

3. The hopper as recited in claim 1, further comprising a ring seal that seals the lid against the upper end of the hopper body, the ring seal comprising a radial seal that seals against an inner surface of the hopper body.

4. The hopper as recited in claim 3, wherein the ring seal is generally L-shaped when viewed in transverse cross section and has at least two radial seals that seal against the inner surface of the hopper body and additionally has an axial seal that seals against an upwardly-facing surface of the hopper body.

5. The hopper as recited in claim 1, wherein the lid has internal openings that are sealed to ancillary devices via internal seals, the ancillary devices including at least one of an access panel, a central spindle that drives a tool, a fill chute, and a vibratory level control device.

6. The hopper as recited in claim 5, wherein at least one of the internal seals is cast into a corresponding internal opening in the lid.

7. The hopper as recited in claim 5, wherein at least one of the internal seals is formed integrally with the ring seal.

8. The hopper as recited in claim 1, wherein each of the side seals is mounted in a groove of one of the hopper body sections and selectively engages a flat surface on the other hopper body section.

9. The hopper as recited in claim 1, further comprising vertically-spaced clamp assemblies that are selectively operable to clamp the hopper body sections together, wherein each clamp assembly engages first and second lugs which are cast into the first and second hopper body sections, respectively, and wherein each clamp assembly includes first and second relatively moveable clamp components that cooperate with one another and with the lugs to selectively clamp the hopper body sections together.

10. The hopper as recited in claim 9, wherein the first and second clamp components of each clamp assembly include a stationary base that is mounted on one of the lugs and a pivotable shank that is mounted on the stationary base and that is selectively pivotable into operative engagement with the other lug.

11. The hopper as recited in claim 1, further comprising a tool holder, positioned beneath the hopper body, for holding a dispensing tool in place within the hopper body, the tool holder being movable about a vertical axis against a tensioning force to move from an operative position retaining the tool in position within the hopper body to an inoperative position permitting removal of the tool from the hopper body.

12. The hopper as recited in claim 11, wherein the tool holder comprises a generally Y-shaped member having a handle at one end thereof and first and second spaced legs at an opposed end thereof that flank the tool and that engage a downwardly facing surface of the tool when the tool holder is in the operative position thereof.

13. The hopper as recited in claim 11, wherein the tensioning force is provided by a clamp that clamps one of the legs against a tool holder mount.

14. The hopper as recited in claim 13, wherein the tool holder mount is cast into the bottom end of the hopper body.

15. The hopper as recited in claim 1, further comprising a tool mount for clamping against the tool, the tool mount comprising a split collar that is cast into the bottom end of the hopper body.

16. The hopper s recited in claim 15, further comprising a handle that is mounted on a section of the split collar and that can be manually actuated to move one hopper body section relative to the other to open the hopper body.

17. A hopper for dispensing granular or powdery materials comprising:
(A) a generally frustoconical hopper body formed from first and second hopper body sections that are hinged together at one side thereof so as to be openable to expose an interior of the hopper and closable to seal the hopper interior thereof, each of the first and second hopper body sections being formed from a cast resin material, wherein the hopper body is open at top and bottom ends thereof;
(B) first and second side seals that are located at opposite sides of the hopper body and each of which seals mating surfaces of the first and second hopper body sections to one another;
(C) a lid that covers the upper opening in the hopper body and that seals against the first and second hopper body sections via a ring seal;
(D) a tool mount, provided at the bottom end of the hopper body, for mounting a tool in the hopper body; and
(E) a tool holder that is located beneath the tool mount and that is manually movable from an engaged position supporting the tool to a disengaged position permitting tool removal.

18. The hopper as recited in claim 1, wherein the seal ring is generally L-shaped when viewed in transverse cross section and has at least two radial seals that seal against the inner surface of the hopper body and additionally has an axial seal that seals against an upwardly-facing surface of the hopper body.

19. The hopper as recited in claim 1, further comprising vertically-spaced clamp assemblies that are selectively operable to clamp the hopper body sections together, wherein each clamp assembly engages first and lugs which are cast into the first and second hopper body sections, respectively, and wherein each clamp assembly includes first and second relatively moveable components that cooperate with one another and with the lugs to selectively clamp the hopper body sections together.

\* \* \* \* \*